No. 769,825. PATENTED SEPT. 13, 1904.
G. M. HUDSON.
INK WELL.
APPLICATION FILED JULY 7, 1904.
NO MODEL.
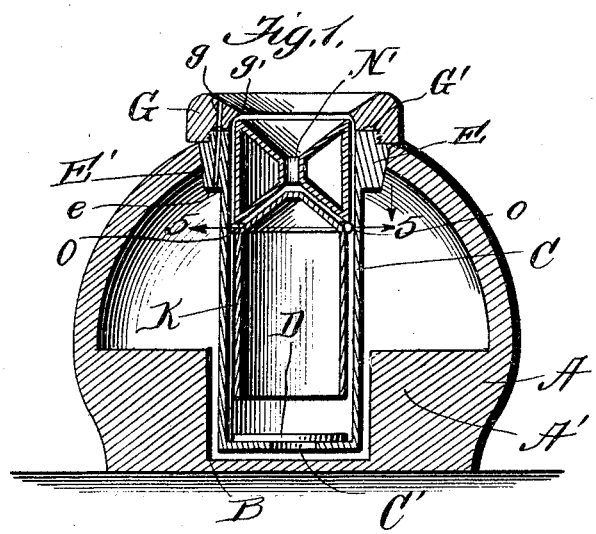
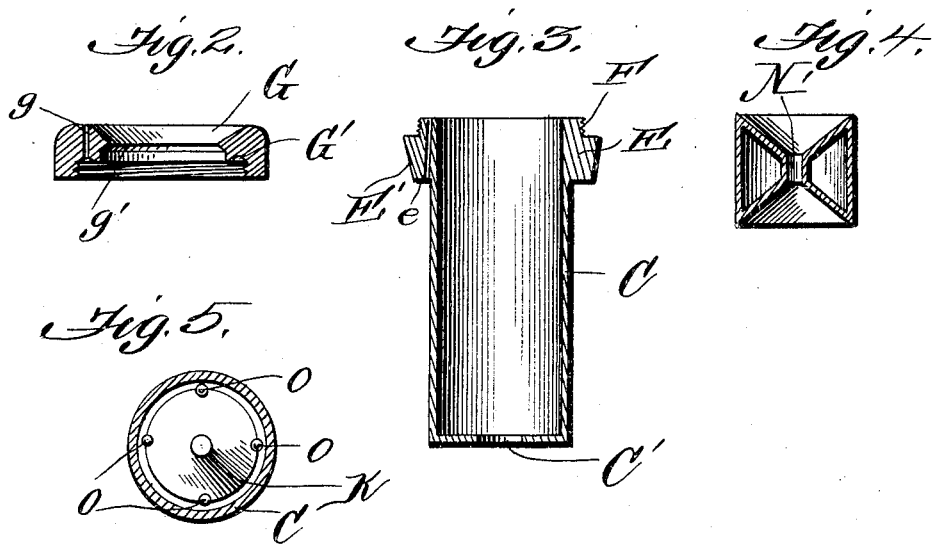
Witnesses
Inventor
George M. Hudson,
By Franklin H. Hough
Attorney No. 769,825. Patented September 13, 1904.

UNITED STATES PATENT OFFICE.

GEORGE M. HUDSON, OF BIRMINGHAM, ALABAMA.

INK-WELL.

SPECIFICATION forming part of Letters Patent No. 769,825, dated September 13, 1904.

Application filed July 7, 1904. Serial No. 215,625. (No model.)

*To all whom it may concern:*

Be it known that I, GEORGE M. HUDSON, a citizen of the United States, residing at Birmingham, in the county of Jefferson and State of Alabama, have invented certain new and useful Improvements in Ink-Wells; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in ink-wells; and the object of the invention is to produce a simple and efficient apparatus in which a pressure of air will cause ink to rise in the well as a pen is depressed into the same, means being provided to feed and cut off the supply of ink being fed into the delivery-compartment of the well.

The invention consists, further, in various details of construction and combinations and arrangements of parts, which will be hereinafter fully described and then specifically defined in the appended claims.

I illustrate my invention in the accompanying drawings, in which—

Figure 1 is a vertical central sectional view through the ink-well. Fig. 2 is a detail sectional view through a cap to the well. Fig. 3 is a sectional view through the central cylinder. Fig. 4 is a detail sectional view of the plunger, and Fig. 5 is a sectional view on line 5 5 of Fig. 1.

Reference now being had to the details of the drawings by letter, A designates the casing of the receptacle, which may be of any desired shape, preferably with a weighted portion A' at the base thereof to prevent the well from easily tipping over, and said base portion has a well B, into which the ink runs before entering the cylindrical delivery-shell C. Said shell has an aperture C' in its bottom through which ink is allowed to pass, said aperture being governed by a disk valve D, which loosely rests upon the bottom of said shell and serves to prevent ink from making its escape through the bottom of said shell when once within the same. A slight space intervenes between the bottom of the shell and the bottom of the well B, and also a space intervenes about the circumference of the shell and the adjacent wall of the well whereby the supply of ink contained within the casing may freely flow into the well before entering the shell. The upper portion of said shell has a flange E, the circumference of which, E', is tapering and is adapted to rest against the inclined wall of the aperture in the top of the casing A. A portion of the circumference of said shell above said flange E is threaded, as at F, and a cap G is provided, having a portion of the wall of the aperture therein threaded and adapted to fit over the threaded top of said shell. When said cap is adjusted in place, as shown in Fig. 1, the bottom thereof will contact not only with the shoulder at the top of the flange E, but also upon the top of the casing A about the marginal aperture therein, thus securely holding the shell to the casing. In order to allow for ventilation to the interior of the casing, an aperture $e$ is formed vertically through the flange E and communicates with an annular recess G', formed in the cap G, from which recess a duct $g$ leads through the cap, as shown clearly in the drawings. Positioned within said shell is an inverted hollow cup K, serving as an air-chamber and of smaller diameter than the shell C for the purpose of providing a space intermediate said cup and shell, through which ink is allowed to rise when wanted for use. When the ink-well is supplied with ink and the cup inserted in the shell, the latter normally rests substantially a half of an inch from the bottom of the well. A plunger N is provided, having the ends thereof inwardly inclined, with a central aperture N', through which the point of a pen may be inserted when it is desired to dip the same into the ink. Said plunger N rests upon lugs O, formed about the upper end of the inverted cup K, and said lugs are provided for the purpose of preventing the plunger from coming in contact with the upper conical end of the cup, so that ink will be allowed to flow freely between said cup and plunger. In order to hold the plunger and the cup within the shell, a flange $g'$ is formed upon the inner circumference of the cap G, thus forming an overhanging portion which will prevent the plunger being removed before unscrewing the cap.

In operation the interior of the casing is filled with ink, after which the shell and the cap, with the other parts of the invention, are adjusted in place, and when it is desired to dip the pen in the ink the point of the pen is inserted in the aperture in the upper inverted conical-shaped end of the plunger, and by applying pressure to the same the cup, which serves as an air-chamber and which contains air intermediate the surface of the ink and the conical-shaped top of the cup, will force the ink contained within the shell up through the space intermediate the cup and shell and through the aperture $N'$ in the plunger. As pressure is relieved from the plunger the cup will rise and the ink from the casing will flow through the aperture $C'$ in the bottom of the shell to replace that which has been drawn off for use. This automatic feeding of the ink into the shell is accomplished by the equalizing of the pressure.

From the foregoing it will be observed that by the provision of the apparatus shown and described a simple and efficient means is provided whereby ink may be automatically fed to a pen and the supply cut off as pressure is removed from the plunger.

Having thus fully described my invention, what I claim as new, and desire to secure by Letters Patent, is—

1. An ink-well comprising a casing with a recessed bottom, a shell positioned within said casing, the lower end of said shell apertured and projecting into the recess of said bottom, a screw-threaded cap fitted to said shell, an air-chamber and a plunger positioned within said shell and retained in place by said cap, and a valve over the aperture in said shell, as set forth.

2. An ink-well comprising a casing having a recess in the bottom portion thereof, a shell having a valve-regulated aperture in the bottom thereof, said shell having a flange with a tapering circumference adapted to rest against the tapering wall of an aperture in said casing, whereby said shell may be held spaced apart from the walls of the recess in the well, a threaded cap fitted to said shell and having an inwardly-extending flange, an inverted cup forming an air-chamber positioned within said shell, a plunger positioned within said shell and held from contact with the upper end of said cup, said plunger having a central aperture in which a pen may be inserted, as set forth.

3. An ink-well comprising a casing having an aperture therein, the wall of which is tapering, and a weighted bottom with a recess therein, a shell having a valve-regulated aperture in the bottom thereof and provided with a circumferential flange near the top thereof, the circumference of which flange is tapering and designed to rest upon the tapering wall of said aperture in the top of said casing, a threaded cap fitted over a threaded portion of the shell above said flange and adapted to rest upon the upper edge of the flange and upon said casing about said aperture in the top thereof, said cap having an annular recess in the bottom thereof with a duct leading through the cap, an inverted cup positioned within said shell and provided with a conical top, lugs projecting from the base of the conical top of said cup, a plunger having inwardly-tapering ends with a central aperture communicating through the ends of the plunger, said plunger adapted to rest upon said lugs and to be retained in place by a flange upon said cap, as set forth.

In testimony whereof I hereunto affix my signature in presence of two witnesses.

GEO. M. HUDSON.

Witnesses:
J. W. COLLIN,
ERNEST KATZ.